United States Patent [19]

Cantineau

[11] Patent Number: 4,716,014
[45] Date of Patent: Dec. 29, 1987

[54] MOISTURE SEPARATOR FOR STEAM GENERATOR LEVEL MEASUREMENT SYSTEM

[75] Inventor: Bertrand J. Cantineau, Braine l'Alleud, Belgium

[73] Assignee: Westinghouse Electric Corp., Pittsburgh, Pa.

[21] Appl. No.: 872,986

[22] Filed: Jun. 11, 1986

[51] Int. Cl.[4] ............................................. G21C 17/00
[52] U.S. Cl. .................................... 376/371; 376/258; 376/402
[58] Field of Search ............... 376/245, 371, 402, 258; 73/299, 302, 326, 328

[56] References Cited

U.S. PATENT DOCUMENTS 4,322,233  3/1982  Sisk ..................................... 376/371
4,394,346  7/1983  Morooka ............................. 376/258

FOREIGN PATENT DOCUMENTS 1116436  4/1979  Canada .

Primary Examiner—David H. Brown
Assistant Examiner—Richard L. Klein
Attorney, Agent, or Firm—Daniel C. Abeles

[57] ABSTRACT

A steam generator level measurement system of the type having a reference leg which is kept full of water by a condensation pot, has a separator pot in the connecting line between the condensation pot and the steam phase in the steam generator to remove excess liquid from the steam externally of the steam generator. The separator pot has an expansion chamber which slows down the velocity of the steam/liquid mixture to aid in separation, and a baffle, which directs steam introduced at the top of the chamber on one side of the baffle to flow downward and then upward for discharge on the other side of the baffle to avoid direct liquid penetration into the line connected to the condensate pot. The extracted liquid, and excess condensate from the condensation pot which runs down the section of the connecting line through which the steam passes from the separator pot to the condensation pot, are collected in the bottom of the expansion chamber and returned to the steam generator below the water level through a drain line. Thus, countercurrent flow of steam and excess condensate only occurs in the section of the connecting line between the separator pot and condensation pot after excess moisture has been removed from the steam thereby reducing the likelihood of liquid blocking steam flow, since the condensate flow from the condensate pot is much smaller than the liquid flow entering the separation chamber.

10 Claims, 3 Drawing Figures

MOISTURE SEPARATOR FOR STEAM GENERATOR LEVEL MEASUREMENT SYSTEM

BACKGROUND OF THE INVENTION

This invention relates to apparatus for measuring the water level in a steam generator of the type which compares pressure at a low point in the vessel witht he pressure in a reference leg which is kept full of water extracted from a high point in the steam generator and condensed in a condensation pot at the top of the reference leg. More particularly, it releate to apparatus external to the generator which separates moisture from the steam supplied to the condensation pot.

A commonly used system for measuring water level in a steam generator, such as for example, the steam generator in a pressurized water reactor (PWR) nuclear power generating plant, monitors pressure at a point below the normal level. In order to eliminate the component of the measured pressure generated by the steam in the generator above the water level, the pressure at the low point is compared with the pressure in a reference leg external to the steam generator which is in communication with the steam phase in the vessel. The reference leg is kept full of water by a condensation pot at its upper end which is uninsulated and therefore, condenses steam from the steam generator. Excess condensation runs down against steam flow, through the tubing which connects the condensation pot with an upper tap in the portion of the vessel above the normal fluid level, but below the level of the condensation pot.

This type of water level measurement system has been subject to malfunctions which are attributable to the line between the condensate pot and the upper tap becoming filled with liquid. Indeed, the above described countercurrent flow of steam and liquid is possible only if:

(a) There is no low point in the line between the condensation pot and the upper tap which traps liquid;

(b) the diameter of this line is large enough to avoid sealing by capillary effects;

(c) no excessive liquid content is present with the steam entering the upper tap; and (d) local effects, mainly dynamic effects due to steam velocity at the upper tap, allow liquid-steam separation.

In existing plants where there has been a malfunction; condition (a) is the first to be verified. Condition (b) is in most cases, marginally met by the ¾ inch tubing typically used for connection between the condensation pot and the upper tap, however, it is impractical to enlarge the vessel penetration for a larger diameter line. Conditions (c) and (d) cannot be easily monitored, and hence, solutions aimed at satisfying them to prevent the drain line from filling with water have only been based upon assumptions.

Prior efforts have been directed toward preventing excess moisture from entering the line between the upper tap and the condensation pot. At the upper tap location, steam contains many entrained droplets which deposit on the vessels walls, and run down the wall into the tubing, filling it with water. This cause of sealing has been successfully eliminated in some models of steam generators by installing an extension on the tubing which protrudes into the vessel beyond the liquid film at the wall. This solution, however, has proved ineffective for other models of steam generators.

Canadian Pat. No. 1116436 suggests the use of a so called tranquilizer which is a perforated ball which surrounds the top entrance. This device tends to establish static pressure at the tap inlet which in some manner separates liquid from steam. It has been successfully used in France with a few exceptions where the failures have been attributed to excessive local liquid content in the steam.

SUMMARY OF THE INVENTION

I have found that the basic weakness of previous efforts to prevent water from sealing the connecting line between the upper tap and the condensation pot at the top of the reference leg in steam generator level measuring systems, is the attempt to achieve steam/liquid separation inside the steam generator. Since the liquid content of the steam and the dynamic effects at the upper tap, which affect conditions (c) and (d) above for countercurrent flow of steam and liquid in the connecting line, can vary widely with power level, generator design and internal flow pattern, the previous solutions have not proved to be effective in all cases. The present invention separates liquid from the steam outside of the vessel where more effective separation techniques may be used. In essence, the invention divides the connecting line between the upper tap and the condensation pot into two sections, separated by a means which extracts the liquid from the steam supplied through a first section connected to the upper tap, and collects the extracted liquid together with excess condensate which runs down the second section of the line connected to the condensation pot. Steam from which the excess liquid has been removed also flows through the second section of the connecting line from the liquid extraction means to the condensation pot. Thus, countercurrent flow of steam and excess condensate only occurs in the second section of the connecting line between the condensation pot and the extraction means. Since the excess liquid has been removed from the steam flowing in this section of the line, the likelihood of the liquid sealing the line is greatly reduced.

The liquid extraction means comprises a separator pot defining an expansion chamber which slows down the velocity of the water laddened steam from the steam generator to effect separation. The size of the expansion chamber is large enough to render capillary effects negligible, hence steam bubbles can separate from the liquid. A baffle extending downward from the top of the chamber divides the chamber into an inlet section, into which the steam from the steam generator is introduced by the first section of the upper connecting line, and an outlet section through which the steam is discharged into the second section of the connecting line. Thus, the steam must first travel downward and then upward in the expansion chamber which further aids separation since slugs of liquid are unable to impinge the tubing inlet towards the condensate pot. The liquid removed from the steam and the excess condensate from the condensation pot accumulate at a lower portion of the expansion chamber and pass through a drain line connected to the lower connecting line for return to the steam generator through the lower tap.

BRIEF DESCRIPTION OF THE DRAWINGS

A full understanding of the invention can be gained from the following description when read in conjunction with the accompanying drawings in which.

DESCRIPTION OF THE PREFERRED EMBODIMENT

The invention will be described as applied to the steam generator of a pressurized water reactor (PWR) nuclear power plant, however, it will be realized by those skilled in the art that it will also have application to systems for measuring fluid level in other types of steam generators.

Figure 1:
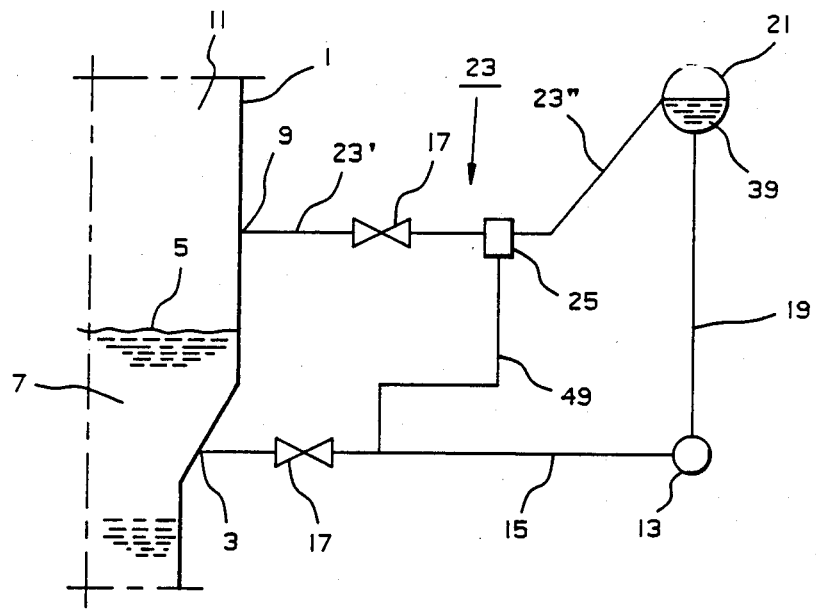
FIG. 1 is a schematic diagram illustrating a steam generator equipped with a level measurement system in accordance with the teachings of the invention.

As shown in FIG. 1, a steam generator 1 is provided with a lower tap 3 below the level 5 of the water 7 and an upper tap 9 in the region 11 of the steam phase. The lower tap 3 is located below the lowest water level to be measured and the upper tap is located above the highest level expected. In this manner, the lower tap is always in communication with liquid phase and the upper tap is always exposed to the steam phase within the steam generator 1.

Figure 2:
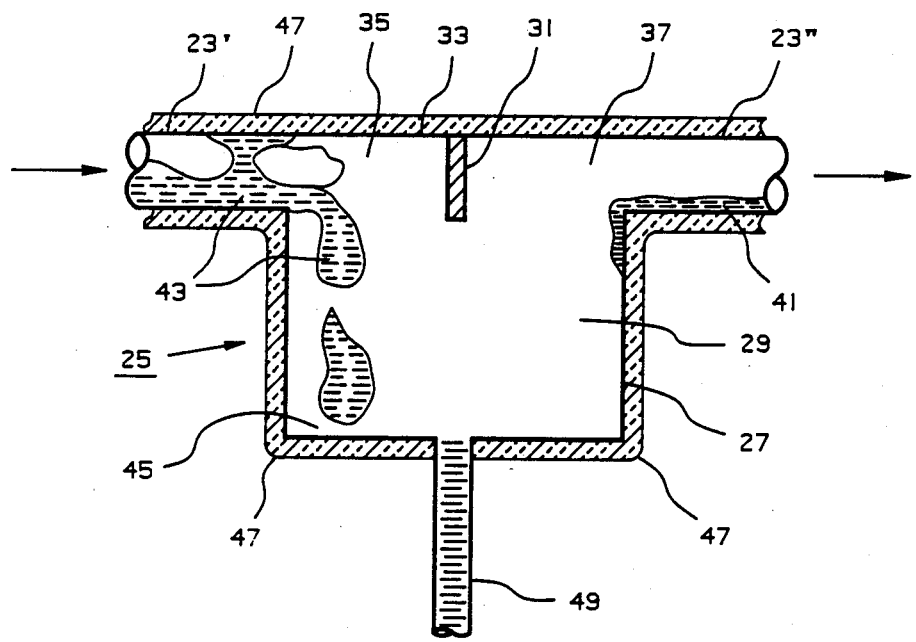
FIG. 2 is an enlarged schematic of a separator pot which forms a part of the level measurement system seen in FIG. 1.

A differential pressure measuring device 13 is connected to the lower tap 3 by a lower connecting line 15 which is provided with an isolation valve 17. Typically, this line is tubing having, for example, an inside diameter of about ¾ of an inch. A reference leg 19 in the form of a tube extends upward from the measuring device 13 to a point above the level of the upper tap 9. A condensation pot 21 is mounted on the top of the reference leg 19. An upper connecting line 23 has a first section 23' extending from the upper tap 9 and a second section 23" connected to the condensation pot 21. The two sections 23' and 23" of the line 23 are connected to a separator pot 25. An isolation valve 17 is provided in the line section 23'. As seen in FIG. 2, the separator pot 25 has a housing 27 which defines an expansion chamber 29. A baffle 31 depending from the top wall 33 of the housing divides the upper portion of the expansion chamber on one side of the baffle into an inlet section 35, and, on the other side, an outlet section 37.

Steam from the steam generator 1 passes through the first section 23' of the connecting line, the separator pot 25 and the second section 23" of the connecting line to the condensation pot 21 where it condenses to keep the reference leg filled with water 39. Excess condensation 41 flows back down the connecting line 23" into the separator pot 25 which is below the level of the condensation pot 21. The velocity of steam through the first section 23' of the connecting line, combined with capillary effects due to the small diameter of line 23', tends to carry liquid slugs 43 with it. The volume of the chamber 29 slows the steam and entrained liquid down which aides in separation, with the liquid accumulating at the lower end 45 of the chamber 29. The diameter of the chamber 29 must be much larger than that of the connecting line 23'; the sizing must allow a free downflow of liquid against steam upflow. According to Zukoski (Influence of Viscosity, Surface Tension and Inclination Angle on Motion of Long Bubbles in Closed Tubes—J. Fluid Mechanics (1966) vol 25, part 4 pp 821–837) the governing parameter for this phenomenon is:

$$\Sigma = \sigma / \Delta \rho g a^2$$

where $\sigma$ = superficial tension of water
$\Delta \rho$ = density difference between liquid and steam
$a$ = tube (chamber) diameter For $\Sigma = 1.2$ the separation rate of liqid and steam is close to zero; below $\Sigma = 0.1$, the separation rate no longer increases with a. For PWR applications, a chamber inside diameter of 2 inches is sufficient for an efficient separation.

The baffle 31 directs the steam and liquid, which enters the chamber 29 horizontally through line section 23', downward in the inlet section 35. The liquid and steam separate from each other in chamber 29 with the steam flowing through the outlet section 37 toward the line section 23" while liquid is left at the bottom of the chamber. The baffle height is greater than the inside line diameter 23" to prevent liquid slugs delivered by line 23' from penetrating the inlet of line 23". Thus, all of the entrained slugs 43 of liquid have been removed from the steam by the time that it enters line section 23" and flows countercurrent to the excess condensate 41 returning through this same line section to the separator pot 25. Both sections of the connecting line 23 and the separator pot 25 are covered with insulation 47 to prevent condensation of the steam within these components, which would cause an unnecessary increase of the condensate flow. The condensation pot 21 is of course uninsulated.

the liquid which accumulates in the lower portion 45 of the expansion chamber 29 in the separator pot 25 is returned to the steam generator through a drain line 49 connected to the lower connecting line 15 between the isolation valve 17 and measuring device 13. As indicated in FIG. 1, the separator pot 25 is above the highest level 5 of water in the steam generator to be measured so that the liquid can drain from the separator pot through this drain line. In the preferred arrangement, the first section 23' of the upper connecting line is horizontal to avoid having to consider a level measurement error caused by the two phase mixture density multiplied by the elevation difference between the steam generator upper tap 9 and the separation pot entrance. Moreover, as no credit is taken for steam liquid separation in this section of the line 23, there is no requirment to have it sloped in one direction or another.

Figure 3:
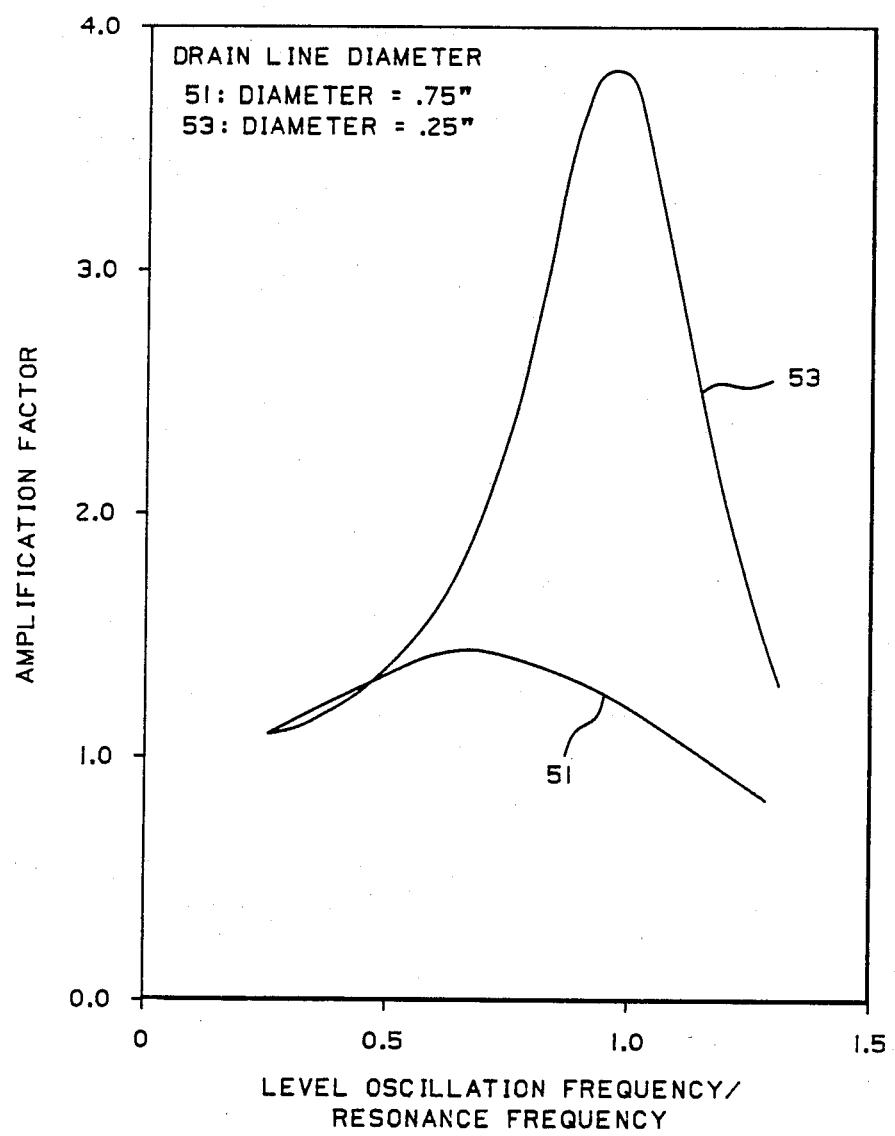
FIG. 3 is a plot of the resonance characteristics of the level measurement system shown in FIG. 1.

Since the drain line 49 forms one leg of a u-tube with the steam generator 1 forming the other leg, consideration must be taken of the effects of level oscillation which are always present in a steam generator. For a given frequency, level oscillation in the drain line 49 can be smaller or larger than those in the steam generator 1, with the ratio of oscillation amplitude between drain line and steam generator being the amplification factor. The resonant frequency, which is the frequency of natural oscillation of the water column in the drain line, is defined by the equation.

$$F = 0.1592_{Ho}(go)^{0.5}$$

where go equals the acceleration of gravity and Ho equals water column height. FIG. 3, which is a plot of the amplification factor on the ordinate and the steam generator level oscillation frequency/resonance frequency on the abscissa (dimensionless), shows by the curve 51 that with a ¼ inch inside diameter drain line 49, the level measurement will not be disturbed by excessive oscillation in the drain line. The curve 53 shows that with a ¾ inch inside diameter drain line, unacceptable effects on level measurement would be encountered.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. In a system for measuring the level of liquid in a steam generator comprising:
   a lower tap connected to the steam generator at a point below the lowest liquid level to be measured;
   an upper tap connected to the steam generator at a point above the highest liquid level to be measured;
   a reference leg external to the steam generator extending substantially from the level of the lower tap to a point above the upper tap;
   a condensation pot at the upper end of said reference leg in which steam condenses to keep the reference leg filled with water;
   a connecting line extending between the condensate pot and the upper tap through which steam passes to the condensate pot and excess liquid from the condensate pot returns; and
   pressure responsive means connected to the lower tap and the lower end of the reference leg for generating a signal proportional to the level of liquid in the steam generator;
   the improvement comprising;
   a separator pot in said connecting line defining an expansion chamber which reduces the velocity of steam and liquid flowing from the steam generator toward the condenstion pot to effect separation of liquid from the steam, said chamber having a low point below the connecting line at which the liquid separated from the steam and the excess liquid from the condensation pot accumulate; and
   a drain line between the low point in said separator pot and said lower tap through which the liquid separated from the steam and the excess liquid from the condensate pot are returned to said steam generator.

2. The system of claim 1 wherein said separator pot divides said connecting line into a first section extending between said upper tap and said separator pot and a second section extending between said separator pot and the condensation pot, and including a baffle within the expansion chamber defined by said separator pot which blocks direct flow of liquid through the expansion chamber from the first section of the connecting line to the second section thereof.

3. The system of claim 2 wherein the first section of the connecting line is connected to the separation pot to introduce steam and liquid into the upper portion of a first side of the expansion chamber, said second section of the connecting line is connected to the separation pot to withdraw steam from the upper portion of a second side of the expansion chamber and said baffle extends downward from the top of the expansion chamber between said first and second sides of said upper portion thereof to direct the steam first in a downward and then an upward direction to avoid direct liquid impingement upon the second section of the connecting line leading to the condensate pot.

4. The system of claim 3 wherein said first section of said connecting line extends substantailly horizontally from said upper tap to said separator pot and said second section extends upward from the separator pot to said condensation pot.

5. The system of claim 3 wherein said connecting line and said separator pot are thermally insulated while said condensation pot is thermally uninsulated.

6. Apparatus comprising:
   a steam generator for a pressurized water nuclear reactor having an inventory of water for generating steam,
   a lower tap located at a point on the steam generator below the lowest operating level of the water;
   an upper tap located at a point on the steam generator above the highest operating level of the water.
   measurement means for generating an indication of the level of water in the steam generator as a function of first and second pressure inputs;
   a lower connecting line connecting the measuring means to the lower tap to supply the first pressure input;
   a reference leg filled with water connected to the measurement means to supply said second pressure input,
   a condensation pot connected to the top of the reference leg to condense steam to keep the reference leg filled with water,
   means connecting said condensation pot with the upper tap to provide a path for steam to flow from the steam generator to the condensation pot, said means including a first section of an upper connecting line connected to the upper tap, a second section of the upper connecting line connected to the condensation pot, and a separator pot defining an expansion chamber with a downwardly extending baffle dividing the upper portion of the expansion chamber into an inlet section, and an outlet section, said first section of the connecting line being connected to said inlet section and the second section of the connecting line being connected to the outlet section such that steam entering the inlet section of the expansion chamber must flow downward and then upward to the outlet section to remove moisture from the steam, said moisture accumulating at the bottom of the expansion chamber together with excess condensation from the condensation pot; and
   a drain line connected to the bottom of the expansion chamber and to the lower connecting line for draining the accumulated liquid from the expansion chamber.

7. The apparatus of claim 6 wherein the first section of said upper connecting line extends substantially horizontally from the upper tap to the inlet section of the expansion chamber defined by the separator pot.

8. The apparatus of claim 7 including insulation around both sections of said upper connecting line and said separator pot.

9. The apparatus of claim 8 wherein said upper and lower connecting lines are about ¾ inch in inside diameter and the drain line is about ¼ inch in inside diameter.

10. The apparatus of claim 9 wherein said expansion chamber defined by said separation pot is about two inches in diameter.

* * * * *